United States Patent Office 3,264,249
Patented August 2, 1966

3,264,249
ADHESIVE COMPOSITIONS OF BUTADIENE POLYMERS USED IN MEDICAL APPLICATIONS
Chisato Araki, Hajime Handa, Tomio Ohta, Junji Furukawa, and Shinzo Yamashita, Sakyoku, Kyoto, and Rokuro Chihara, Nakatsu, Oita, Japan, assignors to Yoshitomi Pharmaceutical Industries, Ltd., Osaka, Japan
No Drawing. Filed Apr. 2, 1962, Ser. No. 184,573
Claims priority, application Japan, Apr. 20, 1961, 36/14,371
8 Claims. (Cl. 260—32.4)

This invention relates to a method for preparing adhesive agents, and more particularly to a method for preparing the adhesive agents having usages of various kinds, including medical applications of same.

Heretofore, the art has endeavored to find ideal adhesive agents for coating and reinforcing the wall of the intracranial aneurysm unsuitable for clipping or ligation in such a way as to prevent a fatal hemorrhage without any impairment of the blood supply to the brain. Several adhesive agents have already been provided by Woodhall and Golden (Archives of Surgery, vol. 66, pp. 587–592 (1953)), Dutton (British Medical Journal, vol. II, 1956, pp. 585–586 (1956); British Medical Journal, vol. II, 1959, pp. 597–602 (1959)), Selverstone and Ronis (Bulletin of Tufts-New England Medical Center, vol. 4, pp. 8–12 (1958)), Golden and Hanbery (Archives of Surgery, vol. 88, pp. 974–979 (1958)) and others (Journal of Neurosurgery, vol. 18, pp. 188–194 (1961); Surgical Forum, vol. 11, pp. 403–404 (1960); Journal of the Japanese Surgical Society, vol. 61, 882–884 (1960); Annals of Surgery, vol. 152, pp. 648–659 (1960)).

However, these agents reported by these authors have not yet been used widely for clinical cases. This is probably due to their inadequate adhesion to the moist surface of an aneurysm, slow hardening, water permeability, or technical difficulties, etc.

Several prerequisites have to be met by these agents; namely, firm and rapid adhesion to the vessel wall, the rapid formation of a fairly strong, waterproof, flexible and elastic film, no toxicity, little or no tissue reaction, and simple sterilization and storage. Very few agents fulfil all these requirements, yet even agents lacking in one or two requirements might be suitable for clinical use.

The present inventors have also studied and searched the adhesive agents which may fulfil the above-mentioned requirements. And as a result it is found that a mixture consisting of a diene-type polymer, a cyanoacrylic acid-type compound and polyisocyanate compound, has very excellent adhesion and moreover it is excellent in durability, strength of the film, elasticity and flexibility.

The present invention has been completed on the basis of the above findings. Namely this invention relates to a method for preparing adhesive agents, which comprises dissolving, to form a homogeneous mass, three components (1), (2), and (3) defined below, in a solvent in the absence of water, so that the ratio between (1) and (2) may be 1:0.7–1.8 by weight and so that the amount of polyisocyanate compound may be more than about 0.3% of the whole amount, and furthermore adding fillers, a softener, a stabilizer etc., if necessary. The three components are:

(1) A compound which has a polymerizable double bond and moreover in which a cyano group bonds to a carbon atom forming the double bond,
(2) A diene-type polymer,
(3) A polyisocyanate compound.

It is an object of the present invention to provide a method for preparing new and excellent adhesive agents which can be applied over a wide range of medical and industrial fields, and another object to provide the adhesive agents. Among the further objects of the present invention is the provision of the method of employing the agents as well as the method of application.

As the diene-type polymer which is one of the materials in the present invention, there may be mentioned natural rubbers, butadiene-styrene copolymers, butadiene-acrylonitrile copolymers, chloroprene polymers, isoprene polymers, isoprene-isobutylene copolymers, etc.

Among other diene-type polymers, however, butadiene-acrylonitrile copolymer which is well known as nitrile rubber is above all suitable for the material of the present invention, for it has excellent adhesion because of its high polarity owing to the presence of cyano group in the molecule, and moreover it can dissolve mutually with other polymers and organic solvents.

The above-mentioned nitrile rubber is generally divided into three classes according to its cyano group content—low nitrile rubber, high nitrile rubber and higher nitrile rubber—and every class can be used in the instant invention. However, the higher nitrile rubber, about 38–40% of nitrile, is most convenient for the present invention.

As the compound which has a polymerizable double bond and moreover in which a cyano group bonds to a carbon atom forming the double bond, there may be mentioned acrylonitrile, cyanoacrylic acids, cyanoacrylic acid esters, cyanoacrylonitrile, methacrylonitrile, cyanomethacrylic acid, cyanomethacrylic acid esters, cyanomethacrylonitrile, etc. However, cyanoacrylic acid esters such as methyl alpha-cyanoacrylate and ethyl alpha-cyanoacrylate are above all favorable for the present invention.

And as the afore-mentioned polyisocyanate compounds, diisocyanate compounds and triisocyanate compounds are conveniently available, and those may be from the aliphatic or aromatic series. For example, there may be mentioned tolylenediisocyanate, the dimer of tolylenediisocyanate, naphthylenediisocyanate, a reaction product between hexanetriol and tolylenediisocyanate, triphenylurethane, phenylenediisocyanate, triphenylmethanediisocyanate, hexamethylenediisocyanate, etc., and those can be used alone, or can also be used as a mixture of two or more.

With the decrease of the amount of diene-type polymer to the compound which has a polymerizable double bond and a cyano group, the adhesive agent increases in spreading rate but decreases in tensile strength. The converse of this is also true, i.e. an increase in the amount of diene-type polymer increases the tensile strength but decreases the spreading rate. Therefore the ratio may suitably be selected in accordance with the purpose of use of the adhesive agent, and about 70–180 parts of diene-type compound to 100 parts of the latter compound by weight may generally be a desirable rate.

As to the amount of polyisocyanate compound, it is desirable that there be a sufficient amount to enhance adhesion by cross-linking of the diene-type compounds and also sufficient to increase the strength of the film. Generally, in order to realize the purpose, about 0.3% of whole amount of the adhesive agent will be sufficient but more favourably more than 3% of whole amount of the adhesive agent.

The present invention comprises dissolving the above-mentioned three compounds in a solvent to form a homogeneous mixture. The order of the addition of the three compounds into a solvent may not be subject to restriction, but it is generally advisable to dissolve the other two components (1) and (3) into the solution in which a diene-type component (2) is being dissolved.

As to the solvents which can be utilized in the present invention, there may be mentioned, for example, nitroparaffins such as nitromethane and nitroethane, ketones such as acetone, methylethyl ketone, hydrocarbon chlorides such as chloroform, ethanedichloride, chlorobenzene, chlorotoluene and trichloroethylene, acetic esters such as methyl acetate, ethyl acetate and butyl acetate, and dimethyl formamide. And these solvents can be used alone, or can also be used as the mixture of two or more. Among the above-mentioned solvents, nitromethane trichloroethylene and nitromethane-trichloroethylene are particularly desirable for the purpose of the present invention. In the mixed solvent of nitromethane-trichloroethylene, the ratio of each component is favorably 3–4 parts of the former to one part of the latter by volume.

If the volume of the solvent is too great, it is apprehended that the rate of adhesion becomes slow, and in cases where the volume of the solvent is too little, it becomes difficult to form a homogeneous solution, and by too high viscosity of the solution, it becomes inconvenient to utilize the adhesive. Therefore it is desirable to select the volume of the solvent used so as to comply with the above factors.. Generally it is advisable to stipulate a volume of solvent as the concentration of the adhesive agent may be about a 5–20% solution.

Further it is preferred to be added that fillers such as carbon black, ferric oxide, calcium silicate, titanium oxide, and the like, softeners such as dibutyl phthalate, dioctyl phthalate, tricresyl phosphate, tributoxyethyl phosphate and various esters, stabilizers such as trimethyldihydroquinone, phenyl - beta - naphthylamine, p - isopropoxydiphenylamine, diphenyl-p-phenylenediamine and the like, may be mixed suitably.

As the adhesive agent prepared by the method of the present invention polymerizes rapidly and forms a stiff film in the presence of a very small amount of water such as atmospheric moisture, it is desirable to use a solvent as well as the materials employed in an anhydrous state. Also it is desirable to exclude air during the preparation.

Thus prepared adhesive agent can be preserved for a long period by being placed in a vessel from which air evacuated, such as an ampoule or the like.

When the adhesive agent prepared by the method of the present invention is applied, it is preferred to apply the agent to the surface of the objective matter by suitable means. The agent applied thus to the objective surface forms a stiff film by polymerizing itself easily by atmospheric moisture without any further treatment such as heating and pressure, then the adhesion is completed.

As this agent has excellent adhesion, the film of polymer so formed has much flexibility and elasticity, and undergoes only very little change over a period of time. It may be useable over various fields, particularly suitable for adhesion of the substances which are easy to move, or which must be fixed for a long time. It seems that the isocyanate group in the present adhesive agent forms crosslinking bonding with the hydrogen atom in the amide group of protein and strong adhesion is completed. Therefore the present agent is very effective for adhesion of the materials consisting of protein such as leather, animal body, human tissue and the like, and more particularly effective for adhesion of suture in operation, adhesion of incised wound, adhesion and reinforcement of blood vessel and intestinal tract, reinforcement of nerve suture, orthopedic operation, cosmetic operation, etc.

Subsequently, the method of application of the present adhesive agent in case of intracranial aneurysms, closure of the cerebrospical fluid fistulae, and cosmetic and plastic skin surgery is made reference to as following examples.

(a) COATING AND REINFORCEMENT OF INTRACRANIAL ANEURYSM

The aneurysm and its afferent and efferent vessels should be dissected as possible from the neighboring tissues if this dissection was completely done, the aneurysm and its tributary should be cleaned up two or three times by dried cotton or gauze or, if possible, by 60% to 70% alcohol solution using a fine hair brush, with the care of not contaminating the surrounding structures by alcohol. At the same time, the whole area should be dried up by a hair dryer; subsequently the present agent should be coated evenly with a fine hair brush until the aneurysm and its tributary will be covered completely. If warm air is applied from a dryer, the evaporation of the solvent of the adhesive agent is promoted and the adhesive agent becomes hard in five to ten minutes. These procedures should be repeated several times to get satisfactory results. On the other hand, if the aneurysm adheres firmly to the surrounding tissue, it is not necessary to dissect the aneurysm completely from the surrounding tissue. Any part of the aneurysmal sac which is to be painted at first should be dried up by the same method as the above-mentioned. Then the present agent should be painted gradually along with the dissection of an aneurysm from the surrounding tissue until the aneurysm and its tributary will be covered completely.

(b) CLOSURE OF THE CEREBROSPINAL FLUID FISTULAE

The agent should be used with the same technique as mentioned above, after the local hair is shaved and cleaned up by alcohol or ether. When marked deposition of the cerebrospinal fluid is present, the agent should be used after the fluid is removed by punctures. If there is a fairly large tissue defect, the agent should be used on the gelatin-sponge by which the defect is covered.

It is contraindicated to use the agent in cases the cerebrospinal fluid is turbid and any evidence of infection is suspected.

In some cases of cerebrospinal fluid fistulae, the agent should be used several times for several days by depending upon the severity of the disturbances of the normal flow of cerebrospinal fluid. By these procedures, the infection is usually avoided and the normal route of the cerebrospinal fluid is obtained.

(c) COSMETIC AND PLASTIC SKIN SURGERY

Prior to the application of the agent, the skin should be adapted exactly by suturing with fine needles or threads. After the local area was cleaned up as mentioned above, the agent is used in between the suture lines. At the same time warm air should be blown from a dryer. After a fairly strong film was obtained within 20 to 30 minutes, sutures should be removed quickly with the care of not producing the crack at the part of the suture line or not stripping off the film. Coating is not ordinarily necessary on the area of removed sutures, but the whole surface should be coated when ever there is a danger of infection. After these procedures were finished, the local area should be kept in a relatively quiet condition for several hours.

As detailed above, the adhesive agent prepared by the method of the present invention can also be applied to over a wide range of substances such as metal, rubber, synthetic resin, synthetic fiber, glasses, leathers, wood, and the like, not to mention the application to animal body and human body. From the above explanation, those skilled in the art will readily understand that the present invention is of practical value, from the medical and industrial points of view.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

*Example 1*

Into 3 milliliters of dried nitromethane was dissolved 0.21 gram of Hycar-1041 (nitrile rubber containing 38–40% of nitrile). Into the solution were additionally dissolved 0.21 gram of methyl alpha-cyanoacrylate and 0.03 gram of tolylene diisocyanate, to which about 1 milliliter of nitromethane was further added, and the solution was made homogeneous.

The solution so obtained, considerably viscous one, may be stored for example in an ampoule in which the air was replaced with nitrogen gas.

Example 2

Into 10% nitromethane solution of Hycar-1041 are added 0.03 gram of tolylene diisocyanate and 0.25 gram of methyl alpha-cyanoacrylate, and the mixture solution is made homogeneous.

Example 3

CLINICAL TRIALS

This composition has been tried in human cases of intracranial aneurysms following inadequate clipping or resection of aneurysmal sacs.

*Case 1.*—S.F., a 51-year-old housewife, was found to have an aneurysm arising from the internal carotid artery at the origin of the posterior communicating artery on the right side. At operation under hypothermia to 28° C., the sac of the aneurysm was found to be much wider than it seemed in the arteriogram, in fact, almost 1 centimeter in diameter. After incompletely clipping the neck of the aneurysm, and then removing the entire sac the vessel was coated with the present agent. The patient is now alive and well a year and 1 month later.

*Case 2.*—S.K., a 58-year-old housewife, was found to have an aneurysm by bilateral carotid angiography arising from the bifurcation of the internal carotid artery on the left side. At operation under hypothermia, the aneurysm was found firmly adherent to the adjacent brain tissue. Clipping of the neck being considered not feasible, the present agent was used to coat the aneurysm. This patient is perfectly well at present 10 months after the operation.

*Case 3.*—T.M., a 47-year-old man, was found to have an aneurysm arising from the middle cerebral artery on the right side. At operation under hypothermia, the aneurysm was found firmly adherent to the adjacent brain tissue. After incompletely clipping the neck of the aneurysm, the entire sac and its tributary were coated with the present agent. This patient is perfectly well at present 4 months after the operation.

What is claimed is:

1. A composition consisting essentially of (1) a compound selected from the group consisting of acrylonitrile, cyanoacrylic acid, cyanoacrylic acid lower alkyl esters wherein the alkyl group contains from 1 to 2 carbon atoms, cyanoacrylonitrile, methacrylonitrile, cyanomethacrylic acid, cyanomethacrylic acid lower alkyl esters wherein the alkyl group contains from 1 to 2 carbon atoms and cyanomethacrylonitrile; (2) a diene-type polymer selected from the group consisting of butadiene-acrylonitrile copolymer, natural rubber, butadiene-styrene copolymer, chloroprene polymer, isoprene polymer and isoprene-isobutylene copolymer; (3) a member selected from the group consisting of diisocyanate compounds and triisocyanate compounds, and (4) a member selected from the group consisting of nitromethane, trichloroethylene and mixtures thereof, the composition being homogeneous and anhydrous, the relation between the component (1) and the component (2) being 1:0.7–1.8 by weight and the amount of polyisocyanate compound being from about 0.3% to about 3% of the total amount of the composition.

2. A composition consisting essentially of (1) a member selected from the group consisting of methyl alpha-cyanoacrylate and ethyl alpha-cyanoacrylate, (2) a member selected from the group consisting of butadiene-styrene copolymer and butadiene-acrylonitrile copolymer, (3) a member selected from the group consisting of diisocyanate compounds and triisocyanate compounds, and (4) a member selected from the group consisting of nitromethane, trichloroethylene and mixtures thereof, the composition being homogeneous and anhydrous, the relation between the component (1) and the component (2) being 1:0.7–1.8 by weight and the amount of polyisocyanate compounds being from about 0.3% to about 3% of the total amount of the composition.

3. The composition as claimed in claim 1, wherein the component (1) is methyl alpha-cyanoacrylate.

4. The composition as claimed in claim 1, wherein the component (1) is ethyl alpha-cyanoacrylate.

5. The composition as claimed in claim 2, wherein the component (2) is butadiene-styrene copolymer.

6. The composition as claimed in claim 2, wherein the component (2) is butadiene-acrylonitrile copolymer.

7. The composition as claimed in claim 1, wherein the component (1) is cyanoacrylic acid ester, the component (2) is butadiene-acrylonitrile copolymer and the component (3) is tolylenediisocyanate.

8. The composition as claimed in claim 1, wherein the component (1) is methyl alpha-cyanoacrylate, the component (2) is butadiene-acrylonitrile copolymer and the component (3) is tolylenediisocyanate.

References Cited by the Examiner

UNITED STATES PATENTS

| | | | |
|---|---|---|---|
| 2,360,867 | 10/1944 | Garvey | 260—32.4 XR |
| 2,436,222 | 2/1948 | Neal et al. | 260—32.4 XR |
| 2,496,267 | 2/1950 | Chaney | 260—32.4 |
| 2,765,332 | 10/1956 | Coover et al. | 260—881 |
| 2,794,788 | 6/1957 | Coover et al. | |
| 2,816,093 | 12/1957 | Coover | 260—881 |
| 2,818,865 | 1/1958 | Jacoby | 128—334 |
| 2,836,181 | 5/1958 | Tapp | 128—334 |
| 2,868,756 | 1/1959 | Watler | 260—32.4 |
| 3,124,136 | 3/1964 | Usher | 128—334 |

ALLAN LIEBERMAN, *Acting Primary Examiner.*

ALEXANDER H. BRODMERKEL, MORRIS LIEBMAN, *Examiners.*

D. W. ERICKSON, L. T. JACOBS,
*Assistant Examiners.*